(12) United States Patent
Bennett et al.

(10) Patent No.: US 12,190,185 B2
(45) Date of Patent: *Jan. 7, 2025

(54) MULTI-PURPOSE SMART CARD WITH USER TRUSTED BOND

(71) Applicant: SentryCard Technologies, Inc., Chicago, IL (US)

(72) Inventors: Mark Bennett, Kenosha, WI (US); John P. Calzaretta, Orland Park, IL (US)

(73) Assignee: SentryCard Technologies, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,940

(22) Filed: Sep. 27, 2023

(65) Prior Publication Data

US 2024/0020504 A1 Jan. 18, 2024

Related U.S. Application Data

(63) Continuation of application No. 17/989,497, filed on Nov. 17, 2022, now Pat. No. 11,797,816, which is a
(Continued)

(51) Int. Cl.
*G06K 19/07* (2006.01)
*G06F 21/31* (2013.01)

(52) U.S. Cl.
CPC ......... *G06K 19/0723* (2013.01); *G06F 21/31* (2013.01); *G06K 19/0718* (2013.01)

(58) Field of Classification Search
CPC ........... G06K 19/0723; G06K 19/0718; G06K 19/00; G06K 19/04; G06K 19/06; G06K 19/07; G06F 21/31
(Continued)

(56) References Cited

U.S. PATENT DOCUMENTS

| 7,278,025 B2 | 10/2007 | Saito et al. |
| 10,318,860 B1 | 6/2019 | Eidam et al. |

(Continued)

FOREIGN PATENT DOCUMENTS

| JP | 2006501583 A | 1/2006 |
| JP | 2006527890 A | 12/2006 |

(Continued)

OTHER PUBLICATIONS

Office Action for corresponding Japanese Patent Application No. 2022-560286 issued Feb. 6, 2024, 14 pages.
(Continued)

*Primary Examiner* — Edwyn Labaze
(74) *Attorney, Agent, or Firm* — Duane Morris LLP (57) ABSTRACT

A new generation "smart card" creates a severable invisible "bond" between the cardholder and the smart card itself where this trusted bond relationship is used to enhance and simplify the authentication process during the use. This new smart card is initiated and connected to a specific user using biometric information added to the card and the user using biometric information connects via a trusted bond with the card by pairing the biometric information which can be severed in one of multiple ways. The trusted bond with the smart card can be broken in one of multiple ways including disconnection from a network, distancing from the user, impact accelerometers, outside parameters, etc. The multi-function smart card also uses this established trusted bond with the user to simplify the authentication of the user for use of the card in encrypted computer network, ground security, or other retail and payment function.

20 Claims, 6 Drawing Sheets

Related U.S. Application Data continuation of application No. 17/324,791, filed on May 19, 2021, now Pat. No. 11,526,717, which is a continuation of application No. 16/839,455, filed on Apr. 3, 2020, now Pat. No. 11,100,379.

(58) Field of Classification Search
USPC .................................. 235/492, 487, 380, 375
See application file for complete search history.

(56) References Cited

U.S. PATENT DOCUMENTS

| | | | |
|---|---|---|---|
| 10,467,832 B2 | 11/2019 | Audebert et al. | |
| 11,734,406 B2 * | 8/2023 | Law | G06Q 20/40145 705/41 |
| 2006/0116970 A1 * | 6/2006 | Scherzer | G07C 9/257 235/382 |
| 2007/0250920 A1 | 10/2007 | Lindsay | |
| 2008/0028230 A1 | 1/2008 | Shatford | |
| 2008/0169350 A1 | 7/2008 | Audebert et al. | |
| 2008/0319911 A1 | 12/2008 | Faith et al. | |
| 2011/0140841 A1 | 6/2011 | Bona et al. | |
| 2016/0203527 A1 | 7/2016 | Grasso et al. | |
| 2017/0118201 A1 | 4/2017 | Hoyer et al. | |
| 2017/0255324 A1 | 9/2017 | Oka et al. | |
| 2018/0039987 A1 | 2/2018 | Molino | |
| 2019/0043045 A1 | 2/2019 | Wilson | |
| 2019/0172055 A1 | 6/2019 | Hale et al. | |
| 2019/0286805 A1 | 9/2019 | Law et al. | |

FOREIGN PATENT DOCUMENTS

| | | |
|---|---|---|
| JP | 5855217 B1 | 2/2016 |
| JP | 2016115098 A | 6/2016 |
| JP | 2017156994 A | 9/2017 |
| KR | 20090036056 A | 4/2009 |
| WO | 2004025545 A2 | 3/2004 |
| WO | 2004114190 A1 | 12/2004 |
| WO | 2021030782 A2 | 2/2021 |
| WO | 2022245777 A1 | 11/2022 |

OTHER PUBLICATIONS

Extended European Search Report for corresponding European Patent Application No. 20928318.3 issued Mar. 13, 2024, 7 pages.
PCT International Search Report for PCT Application No. PCT/US2020/049135 issued Dec. 28, 2020.
Examination Report for Australian Patent Application No. 2020439471 dated Mar. 31, 2023, 2 pages.

* cited by examiner

MULTI-PURPOSE SMART CARD WITH USER TRUSTED BOND

CROSS REFERENCE TO RELATED APPLICATIONS

The present application is a continuation application of U.S. patent application Ser. No. 17/989,497, entitled MULTI-PURPOSE SMART CARD WITH USER TRUSTED BOND, filed Nov. 17, 2022, which is a continuation of U.S. patent application Ser. No. 17/324,791, entitled MULTI-PURPOSE SMART CARD WITH USER TRUSTED BOND, filed May 19, 2021, now U.S. Pat. No. 11,526,717, which is a continuation of U.S. patent application Ser. No. 16/839,455 entitled MULTI-PURPOSE SMART CARD WITH USER TRUSTED BOND, filed Apr. 3, 2020, now U.S. Pat. No. 11,100,379, each of which is incorporated herein by reference.

FIELD OF TECHNOLOGY

The present disclosure relates to a new generation "smart card" designed to create a severable invisible "trusted bond" between the card holder and the physical embodiment of the smart card where this trusted bond relationship, based on biometric verification, is used to enhance and simplify the authentication process and general financial or commercial use of the multi-purpose smart card.

BACKGROUND

Until such time as when chips can legally be implanted into a person's body, or that a Big Brother society will be able to recognize any person at any location, there will be a need for identification or the use of an interface between humanity and the digital world. One of the main ways is by using small portable cards or other small objects like a digital watch or a digital phone capable of some type of interaction-either visual by an agent or automated via network functions. In addition to simple identification, "cards" can do much more, like serving as links for banking transactions or storing funds or credits for goods or services. The current invention advances the field of portable card identification and use.

As part of this disclosure, the words "cards" or "smart cards" are used generally to mean any tangible object, often but not always in the shape of a credit card, having capacities and functions as described below. Historically, wallets went from bills/coin currency to credit cards of a standard size. Historically such cards and their shape have remained known and able to easily slide in most readers and most wallets. As a consequence, while these "cards" or "smart cards" could take any shape or form, for example the one of wearable jewelry, the most common form is as a flat, palm-sized piece of plastic.

As background, in the late 1960's, Helmut Grottrup and Jurgen Dethloff secured German Patent No. DE 1574074 over the placement of a tamper-proof identification switch on a card using a semiconductor device. These first cards were designed to provide individual copy-protected keys for releasing the tapping process at unmanned gas stations. By 1974, U.S. Pat. No. 4,105,156 was issued in which the first officially-named "smart card" was described. The invention was titled, "Identification System Safeguarded Against Misuse." This first device was designed with a secret number code which, when entered, would destroy an input gate and block a portion of memory stored in the device for security purpose. At this time, people used national identification cards (IDs) and checks for banking payments. Slowly the complexity of these cards increased, and by 1977, they had two chips (one microprocessor and one memory) that allowed a Self-Programmable One-chip Microcomputer (SPOM) to be used.

Quickly the market for smart cards exploded around the world. By 1992, the Carte Bleue debit cards began to be widely used in France. Improving on normal banking or credit cards, these new Carte Bleue (Blue Cards) were programmed at issuance and came with an activation code called a Personal Identification Number (PIN) which had to be typed on an ATM terminal or restaurant portable station in which the card was inserted and read. But these PINs, while improving on security, could be copied, stolen or learned simply by looking over the shoulder of a user. One way to circumvent the PIN system is to use card owner data, such as zip code, which is often used at gas pumps. Often, PIN's are four digits while zip codes are five digits.

These new cards also included an electronic contact pad structure now commonly found on most credit cards in the United States and most SIM cards in cell phones. Seven electrical contacts are structured like the fingers on a closed fist and will power a flat, miniaturized processor/memory group able to respond to electronic inputs over the contacts. Another later-in-time improvement is linked with the capacity to store inside the memory of these new cards "credits" of some other type of recognized currency instead of simply authentication information. For example, a restaurant chain could have a ledger where outstanding "gift cards" have enumerated credits and require log-in, validation, and update using a network. The new invention allowed these cards to simply be programmed with currency/credits and safety systems for use and update locally at a reader in any one of the chain's locations. Consequently, some card-based systems serve as "purses" and will contain some funds able to be redeemed only at certain readers. This allows the reader/card to be decoupled from any network or a remote computer/bank where the transaction would be approved. As described above, the nature of the use and function between these two types is fundamental and results in completely different methods of use thereof.

Around the same period as the Blue Card, a type of smart cards began use in Global System for Mobile Communications (GSM) mobile phones which operated with a small Subscriber Identify Modules (SIMs). A phone number is connected to the SIM which can be slid into any phone for access to a network of phone services. Around the world, many types of credit cards and debit cards began to be issued with more than a simple magnetic strip. The United States has always been rather reluctant to implement any change in how commercial transactions are handled either by not increasing currency denominations like other nations, not implementing plastic-based currency, adding coinage for low denominations or changing credit or debit cards to smart cards. What is incontestable is that the world is migrating from normal paper-based currency to digital currency.

Figure 1:
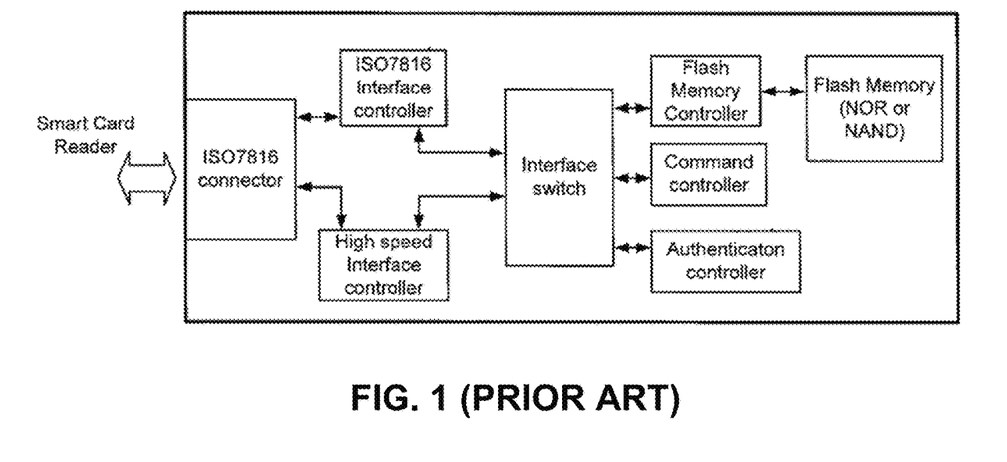
FIG. 1 is an image taken from U.S. Pat. No. 7,350,717, titled "High Speed Smart Card with Memory."

In 2005, Mr. Finis Conner invented a new type of smart card. It was described as U.S. Pat. No. 7,350,717, titled "High Speed Smart Card with Memory." One figure from this patent is reproduced as FIG. 1. This new smart card included several new features, such as a switch for toggling between two controllers each having access to memory at a different speed, and other onboard controllers for sending and receiving commands. The disclosure of this patent is hereby incorporated herein by reference as it offers an interesting background and key terminology of this technology. The ownership of this technology remains today with the inventor of the current new smart card described hereafter. The above invention was used primarily in areas of technology where a higher degree of safety and security is needed and is critical, such as for the access to military installations, enhanced use of cards in high value transactions, or even building security.

One of the key problems with smart cards remains their portability, their flexibility and, more importantly, their management of power rendering them useless when power runs out and processing inside the card requires local energy (as opposed to energy being drawn from the connectors). If not properly charged at all times, these cards can lose functionality. For example, two types of competing technology exist in the RFID space where the first is an inductance-based low-power powering of the internal message (e.g., micro-chip in marathon races) and the other requires some type of local power source and emission using an antenna (e.g., garage door opener). The same way, smart-cards can operate with onboard power or not.

In late 2013, a massive amount of traditional credit card information (name, card number, PIN number on back of card, and social security) was stolen from the retail corporation Target®. This sent a chilling reminder to all users of credit cards around the United States that while systems were convenient, they now were vulnerable to hacking and corporate manipulation. More chilling, the storage and ownership of personal information on customers could result in severe liability to stores who were vulnerable to theft. For example, Amazon.com® has a single-click purchase which requires the storage of a client's residence and financial billing information. In 2014, Target® was one of the first U.S. corporations to decide it would finally implement smart chip technology in order to protect itself from future credit card identity theft. It also decided to stop storing personal information. Around the same time, several States began enacting obligations and limitations on the collection, storage and management of client information.

Since that time, in the United States, the use of Europay MasterCard Visa (EMV)-compliant cards has increased almost exponentially. This system is called the "chip and PIN" mode. In the United States today, most cabs and retail surfaces are equipped for reading a smart card chip and will warrant its use when present on a card. The system in the United States remains the "Chip and Signature" format instead of the use of a PIN. The system only is designed to avoid online theft of numbers, but does not require an active code from the user.

In parallel with smart cards built with a chip, memory and contacts, a new technology linked with contactless cards was invented around 2004. These systems became more popular for payments and ticketing. A typical use includes mass transit and highway tolls. Most of these systems are incompatible, but the MIFARE™ Standard from NXP® Semiconductors is the market leader. These "contactless" cards have grown for use of NXP MIFARE Ultralight and paper/card/PET rather than PVC. These low cost cards are distributed by vending machines. These cards now include citizen cards, driver's licenses, and patient cards to name a few. There are standards for smart cards with contacts (ISO/IEC 7816) and for contactless cards (ISO/IEC 14443). One famous contactless system is the American Express ExpressPay™.

For example, a new type of passport called e-passport, ePassport® or digital passport is a traditional paper passport with an embedded electronic microprocessor chip which contains some biometric information that can be used to authenticate the identity of the passport holder. The current standard uses (a) facial recognition, (b) fingerprint recognition, or (c) iris recognition. These biometric file formats are stored according to ICAO Doc 9303 from the International Civil Aviation Organization. By 2017, about 120 countries have moved to biometric passports which rely on machine-readable lines stored and accessed using the famous Public Key Infrastructure (PKI) to authenticate data. For the moment, the United States Passport Card is not ICAO9303-compliant. Under the ICAO9303 standard which meshes with the ISO/IEC 14443 standard, a minimum of 32 kilobytes of EEPROM storage memory is needed.

In 2011, the current owner of this technology also secured U.S. Pat. No. 8,811,959, titled "Bluetooth Enabled Credit Card with a Large Data Storage Volume." This invention was groundbreaking in many ways. It included a Bluetooth stack, use of a photovoltaic power source, and use of a piezoelectric power source also to recharge/extend the technology. The technology included two batteries stacked over a flexible substrate and multiple electronic micro-components such as oscillators and a finger reader zone. The card included multiple logical elements to help manage an oscillator, a flash NOR and NAND memory, a battery, and the battery recharge. The system also included an encryption engine and the use of biometric information. This patent is also incorporated herein in full by reference.

Figure 2:
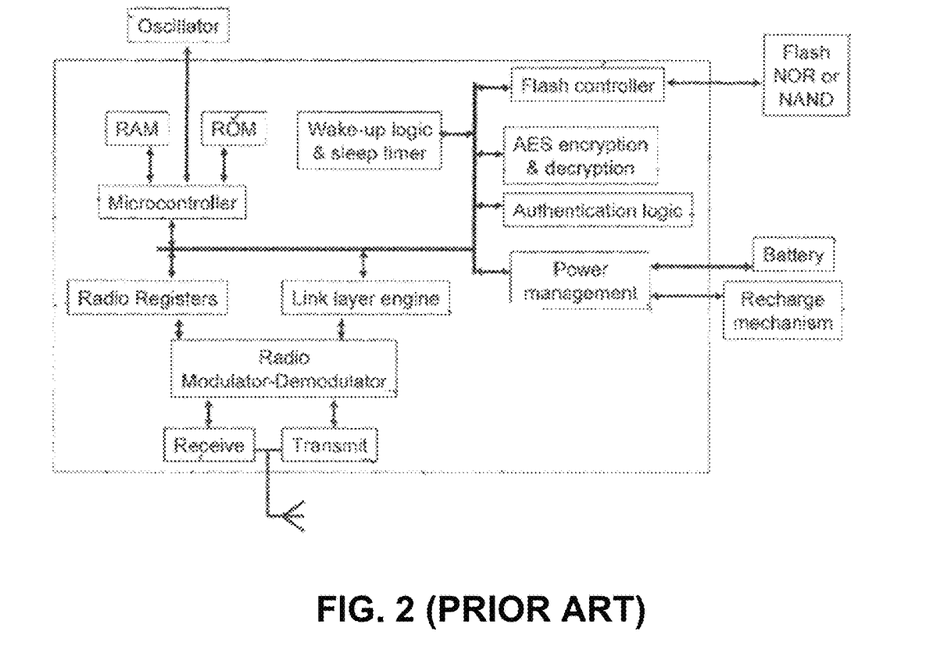
FIG. 2 is an image taken from U.S. Pat. No. 8,811,959, titled "Bluetooth Enabled Credit Card with a Large Data Storage Volume."

Some cards, as those described in U.S. Pat. No. 8,811,959, is about 85.6 mm long, 53.98 mm wide, and 0.76 mm thick. The card 1 has a base layer and a top layer. An illustration from this patent is shown at FIG. 2. These layers are preferably polycarbonate, polystyrene or equivalent sheet materials. The top and bottom layers can be printed with artwork as desired. This card contains a battery compartment where two batteries are installed, mounted one on top of the other. The batteries are preferably commercially available products, (e.g., part number MEC102) provided by Infinite Power Solutions™, Littleton™, Colo™ or equivalent. Batteries are mounted to a flexible substrate with electrical inter-connections. Spaces are filled with plastic to provide a smooth flat surface to attach the top and bottom layers to the card.

These cards also provide a large surface area to prevent delamination with use. Each battery (back in 2011) was rated for 2.5 milli-ampere-hour (mAH) and could supply 100 milli-amperes (ma) of current. The batteries are about 25.4 mm×50.8 mm×0.17 mm, and when stacked together occupy about 0.4 mm of thickness of the card. The two batteries connected in parallel provide 5 mAH. If the electronics on the card consumed, for example, 45 milliamperes (or mA), a transaction using the card could last about 400 seconds. Assuming they are charged to 75% of capacity, for a typical transaction the maximum duration would be 300 seconds or 5 minutes. At Bluetooth data transfer rates of 1.5 MB per second, the 5 minutes allow about 56 MB of data to be transacted.

An alternate battery pack, manufacture's part number PGEB0053559, is available from PowerStream®, West Orem, Utah. The dimension of this battery is 0.5 mm×35 mm×59 mm and it is rated for 65 mAH. When using this battery, only a single cell is required, and longer data transaction periods are possible. Both batteries described above are rechargeable, enabling an increase the amount of data exchanged per transaction, as well as the usable life of the card. The battery can be recharged autonomously via integrated energy harvesting, using technology such as piezoelectric films, RF antennas or flexible photovoltaic films. An area provided in the card contains the recharge mechanism. In a preferred embodiment, a piezoelectric bender element polarized in the cantilever mode is utilized. As the card is carried in a wallet or the user's clothing, bending of the card will deflect the piezoelectric element generating voltage. This voltage can trickle charge the battery. Additionally, by fanning the card, an electrical charge can be generated and the battery charged similar to a self-winding mechanical watch. Thus, if battery power is low, a fanning operation can be used to complete a transaction.

In another preferred embodiment, a coil can be embedded to act as an inductor to pick up electromagnetic radiation. The electronics on the card these uses these signals to trickle charge the battery. Other embodiments consist of both the piezoelectric element and the coil embedded in the smart card. Alternatively, a solar cell array can be built into the card. Electronic components can be mounted to flexible substrate with electrical connections among these components and the recharge mechanism. Memory module is a semiconductor flash integrated circuit. In 2011, fabrication technology provides 8 GB storage capacity with NAND flash in a die size of 135 mm2. Fabricated from a 300 mm or a 200 mm wafer, the circuit will have a thickness of about 750 microns. With time, this technology improved.

Communications interface, transaction security, general microprocessor functionality, "wake-up" logic, power management and radio modulation are preferably provided as a single integrated circuit. Of course other embodiments can use multiple circuits to provide this functionality. Appropriate discrete devices and an oscillator are also mounted to the flexible substrate. The volume can be filled with plastic or can consist of a hot laminate structure made from a number of plastic sheets with suitable thicknesses to fill the space and create a flat surface for top layer. This enables the top layer to be laminated maximizing the contact area to prevent these films from delaminating with use.

If carried in a wallet or in clothing or if the fanning operation is employed to recharge the battery, the card could take a deflected shape. ISO 7816 specifies the deflection limits for the card. One block diagram of the electronics resident on these cards was shown and includes a microcontroller back in 2011 preferably an 8051 or an ARM processor-8 bit or 32 bit-depending on desired features, performance and cost. Control firmware resides in read-only memory. Dynamic random access memory stores variables and provides scratch memory space. In an embodiment RAM is a non-volatile read/write memory which is predominately in an "off" state. Oscillator and wake-up and sleep timer logic then controls the power to the electronics.

Residing predominantly in the "off" state, this card powers up only when information is requested. Service handshake activity is used to establish a personal area network. Data storage is either in NAND or NOR flash circuit, having either a serial or parallel interface with flash controller. Because it improves reliability in reducing the likelihood of a trace breaking, a serial interface minimizes the number of inter-connects and is preferred. In implementations requiring more data handling, a parallel interface provides faster data through-put.

Also, an encryption engine is used to encrypt data transmitted from card to the external host. Authentication logic allows this card to establish a secure link with the external host and satisfy security conditions for a transaction. Physical security can be provided via hardened epoxy coatings applied to the complete packaging or to relevant components or data paths in the card. This helps protect sensitive information such as cryptographic keys and biometric templates. This tamper-proof protection can be implemented such that if an adversary attempts to peel off this coating for probing, the packaging would be destroyed rendering it useless. In other embodiments where cost is an important consideration, the tamper-proof physical security is applied only to the encryption engine, which contains a small amount of non-volatile storage to store a cryptographic key referred to as the master storage key. Sensitive data is encrypted using the master storage key and stored in unprotected memory module.

The power management circuit contains logic to power specific logic blocks in the sample card. A switch can be fabricated in the card to control the power supplied by the battery. This switch uses mechanical contacts attached to the top layer and attached to the bottom layer. The switch is activated when the user depresses a region. In other embodiments, the switch may be implemented as a capacitive or thermal sensing unit, where proximity of the user's finger or body heat activates the switch. The advantage of using a switch is that battery power is used during a transaction only and at all other times the card is in the "off" state. In addition, greater security is achieved because the electronics remain inactive in this "off" state. This makes the card less vulnerable to a denial of service attack where an adversary attempts to use Bluetooth-enabled host devices to connect to the card to prevent or delay the card's connection to an intended device.

A display can be fabricated in the card as an E-ink unit or a dot matrix device. This display allows pin codes and passwords to be displayed during a transaction. Less expensive arrangements use a thin LED or an LED/display located in the host unit. The switch can include a thin fingerprint sensor, for example, one manufactured by e-Smart™ Technologies Inc. This sensor has a thickness of about 0.2 mm. The sensor sheet can be fabricated in the top cover such that when the user depresses switch, as the card powers up, the fingerprint pattern is detected. This pattern is compared with the stored template which was created when the card was issued. If a valid match is obtained, the transaction is allowed to proceed. If the match is invalid, then power is never supplied to the circuitry and card remains inactive. To overcome the probability of false rejects, the user can clean the card to remove debris and retry or use another registered finger.

All of the control logic can be implemented as a single, mixed signal ASIC to attain the lowest bill of materials cost and to minimize the number of interconnects on the flexible substrate. In other embodiments, the analog portions are on separate chips from the digital logic. The digital logic includes the microcontroller, RAM, and ROM, which can be on a single integrated chip. Other embodiments include storage memory in the same digital logic chip to achieve the highest level of integration. This implementation reduces cost and minimizes interconnects among the electronic blocks. In addition to executing the on-board firmware stored in ROM, the microcontroller also fetches the firmware stored in storage memory, loading it into the RAM and executing it. The firmware stored in storage memory consists of software code for multiple applications authorized by the card issuer to run on the card. These applications may have been developed and tested after manufacture of the card.

Figure 3:
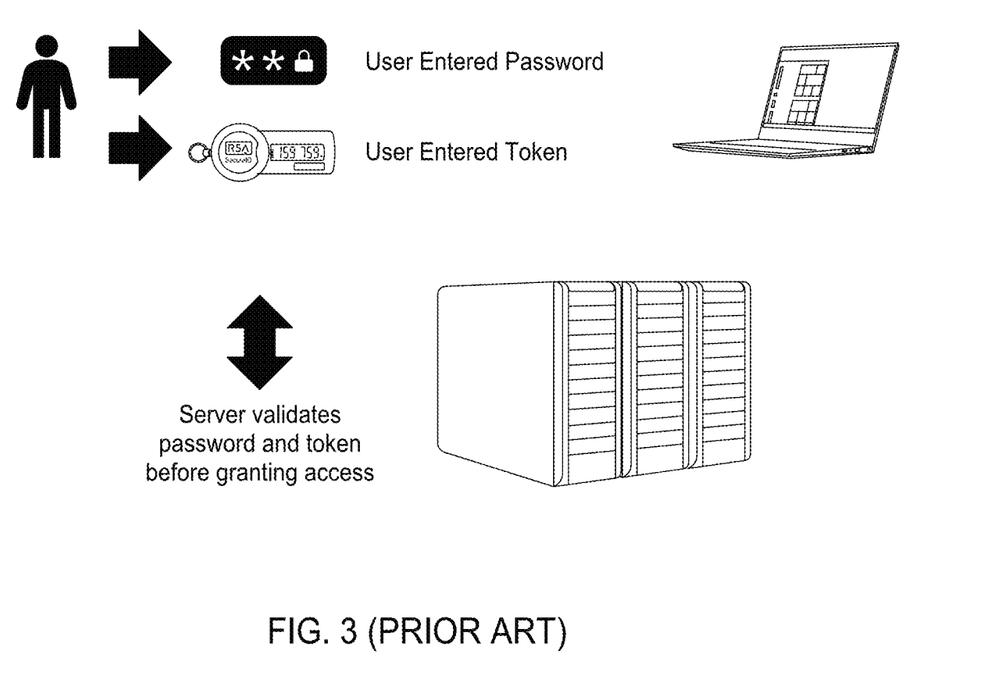
FIG. 3 is an image from the prior art illustrating generally known and ordinary multi-factor security processes using both password and token generators.

As shown at FIG. 3, one of the most common way to authenticate a user today is by a two-step process where the user has a defined password (e.g., samplepassword123), which the user has pre-selected, is normally known only to him/her, and is stored on the system (back-end server) to which access must be given for the transaction. The use of this password is problematic in that if it is too simple it can be easily guessed, but if too complex it cannot be memorized and will require a user to write the password down. Also, those given access to the back-end server where passwords are stored often will have access to a large number of passwords.

So often, when a person goes to the workplace of an individual and looks around at notes on the wall, a complex password can be discovered. As shown at FIG. 3, to enhance this protection, at the time of access using the normal password, the queried server will create a second-step authentication. It will generate a "one-time-password" (OTP) which is sent (e.g., 823124), using one of multiple ways to the user. Recently, Facebook.com® has begun including this OTP located in a sub-menu of an App that is paired with the server OTP generator. In most cases as shown, users are given a personalized key with a number generator linked with the server (user entered token on FIG. 3), or if the server was given the phone number of the user's cell, a request is sent with a code number for entry. To give access, the servers will require this multi-factor authentication (e.g., samplepassword123+823124 or samplepassword123 and 823124 in two steps at different software levels). The problems with this system is that it does not eliminate the inherent vulnerability linked with passwords as to their storage, their difficulty to memorize, and their capacity to be discovered. Such two-step processes, while much safer, are costly and timely to manage on both ends of these secured transactions. They put an additional burden on the user who must be able to receive the additional code. It is also difficult to establish this process unless all systems work, have power, and there is network connectivity with the backend server. For example, the United States Patent and Trademark Office (USPTO) has moved to a two-step system instead of a PKI system. A user enters a first password and requests a second code which is later entered. In case the system is slow in response, users may wait or make several sequential requests generating codes which override each other.

As a matter of rule, true safety and security should be impossible to bypass and even notice. Safety systems should be designed to simply not operate when safety is compromised. But as science-fiction often portrays, for each safety system, fraudulent actors and experts who have as a single purpose the infiltration into a system can always bypass a password by also bypassing the second layer of protection. If each factor of a multi-factor authentication system suffers from the same problems, then it offers "as a whole" no greater level of security for those determined to infiltrate. For example, as shown at FIG. 3, if a person has a note in his/her wallet with the first password and has the personalized device for token generation in his/her bag, the theft of the bag would result in stealing both the password and the token.

What is needed is a new level of security, a higher level of security which relies upon smart cards, but creates a new process, method, and apparatus of use which improves upon every existing system.

SUMMARY

The present disclosure relates to a new generation "smart card" designed to create a severable invisible "bond" between the cardholder and the smart card itself where this trusted bond relationship is used to enhance and simplify the authentication process and during the use of the multi-purpose smart card. This new smart card is initiated and connected to a specific user using biometric information added to the card, and the user, using biometric information, connects via a trusted bond with the card by pairing the biometric information. The trusted bond with the smart card can be broken in one of multiple ways including disconnection from a network, distancing from the user, impact accelerometers, outside parameters, etc. The multi-function smart card also uses this established trusted bond with the user to simplify the authentication of the user for use of the card in an encrypted computer network, ground security, or other retail and payment function.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 4:
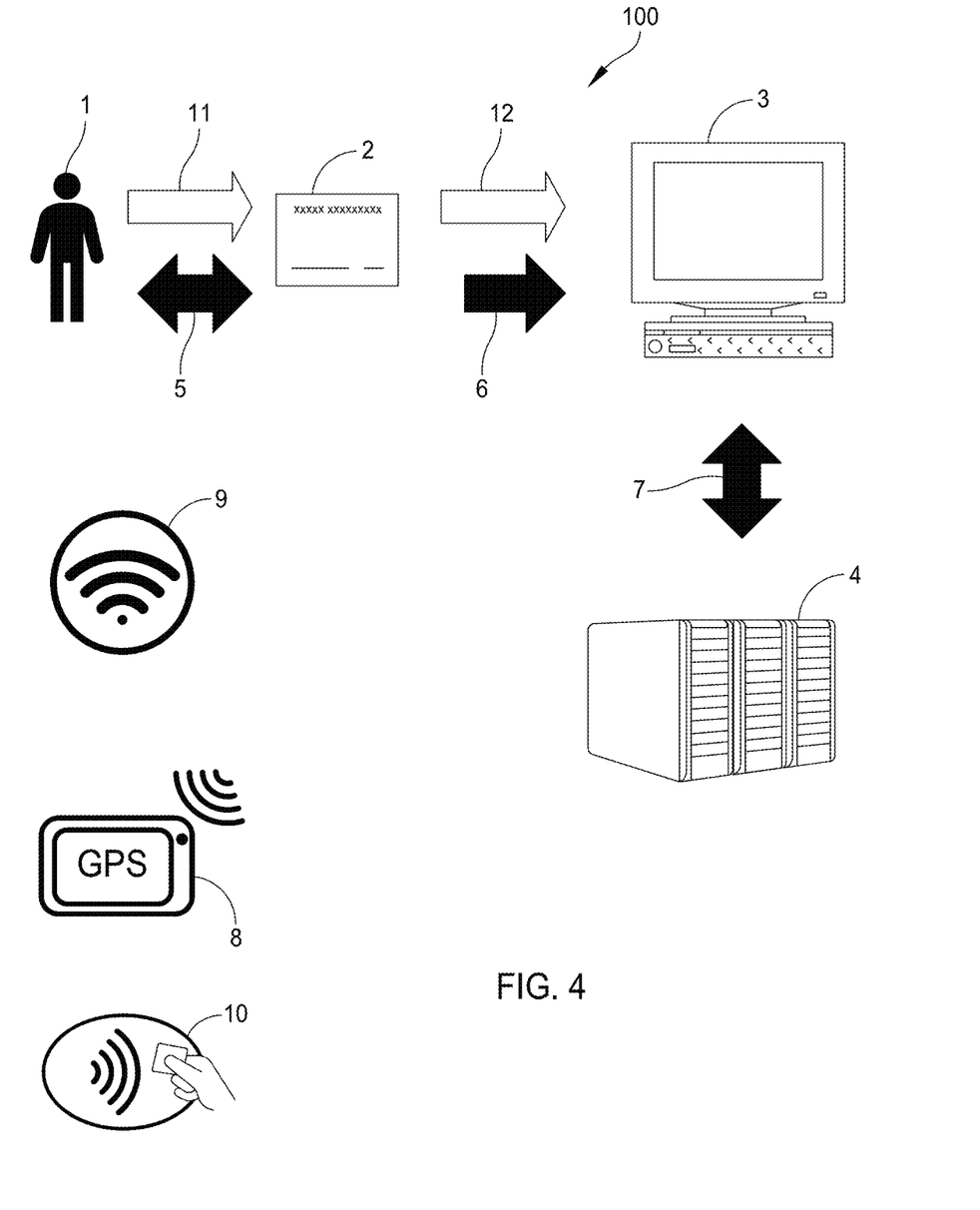
FIG. 4 is an image of a system for safely gaining access to a software network and platform using a multi-purpose smart card with user-trusted bond.

Proof of identity in the physical world typically requires the physical presence of the individual as shown as 1 at FIG. 4 in combination with the presentation of an approved/trusted form of identification, such as a picture ID. This form of physical identity proofing, having evolved over many years, generally provides an adequate level of proof for most types of transactions where proof of identity is required (e.g., financial transactions, border crossing, etc.). But as teenagers in search of alcohol have shown, nothing is simpler than creating a fake ID.

Improving on the principles shown at FIGS. 1-33 and described in the background section, as shown at FIGS. 4-8, a new technology of smart card 2 as shown can be created where, as shown by arrow 6, it alone sends directly all of the required identification to a computer system/host 3, who passes it to a server 4 and/or a host such as a card reader. The information transferred by arrow 6 can directly be a multi-factor piece of information (e.g., either biometrics+passcode, biometrics+OTP Code, passcode+OTP Code, etc.).

As shown at FIG. 4, a user 1 is paired 5 to a multi-purpose smart card 2 with trusted bond 11. Once paired 5 and the bond 11 established, the card 2 send information 6 at once to the computer system 3, or send 7 information relating to the bond 12 to the computer system 3, the server 4 or any other location. The general principle is that the new card 2 has a capacity to not only interact with the user 1 in an ordinary means 5 where data can be transferred, but once the card is paired 5 to the user 1, a temporary and severable bond 11 can be created and established and used alone or in conjunction with the paired 5 situation. The same way, data linked with this established bond 12 can be transferred alone or in conjunction with normal authentication. More is described below once the hardware is explained.

Hardware

Generally, a system of use 100 of the multi-purpose card 2 is shown at FIG. 4 generally. This card is also shown in close-up at FIG. 5. As shown generally, the card includes a top layer 31 and a bottom layer 32. Part of the system 100 includes environmental conditions such as a local wireless network 9 often found at any place of employment, place of interest (e.g., the Starbucks® employee free network). These days, GPS or normal 5G telecommunication networks 8 also have a reach in the environment where the system 100 operates. Also, the inventor noted how RFID or Bluetooth short distance data transfer or data connection systems 10 also are found in this environment of use of the system 100. Also contemplated and not shown is any type of environmental wave or energy (e.g., radio waves, solar waves, heat waves, etc.) that can ultimately be caught and interact with any receiver or transceiver located in the card 2 in the environment. To understand generally how the system 100 works, a trusted bond 11 is created between a user 1 and his/her card 2 in addition to any ordinary means of communication and pairing 5 such as contact, scanning, etc. The trust can be built using multiple ways described below which in part rely on many factors including environmental 8, 9, 10 factors.

Said otherwise, the system 100 is a dynamic environment where external sources or transfer paths are in direct or semi-direct relationship with the card 2 and computer systems associated thereto. For example, and to name a few, card 2 could be used to allow an elevator to access a secured floor in a building. As part of this example, the elevator command bay is element 3 which is connected to a back-end server 4 remotely. As the elevator moves, this results in a change in environmental factors (i.e., the gravity) felt by the card 2 if it includes an accelerometer. In addition, because of the large metal box of the elevator, a value can be calculated of a Faraday resistance factor linked with the electromagnetic insulation of the elevator when closed. The same way portable exercise equipment now has sensors designed to measure external stimuli of the user (e.g., running, heart rate, acceleration, speed, etc.) the new card 2 relies upon these core principles as part of the pairing process 11.

Figure 5:
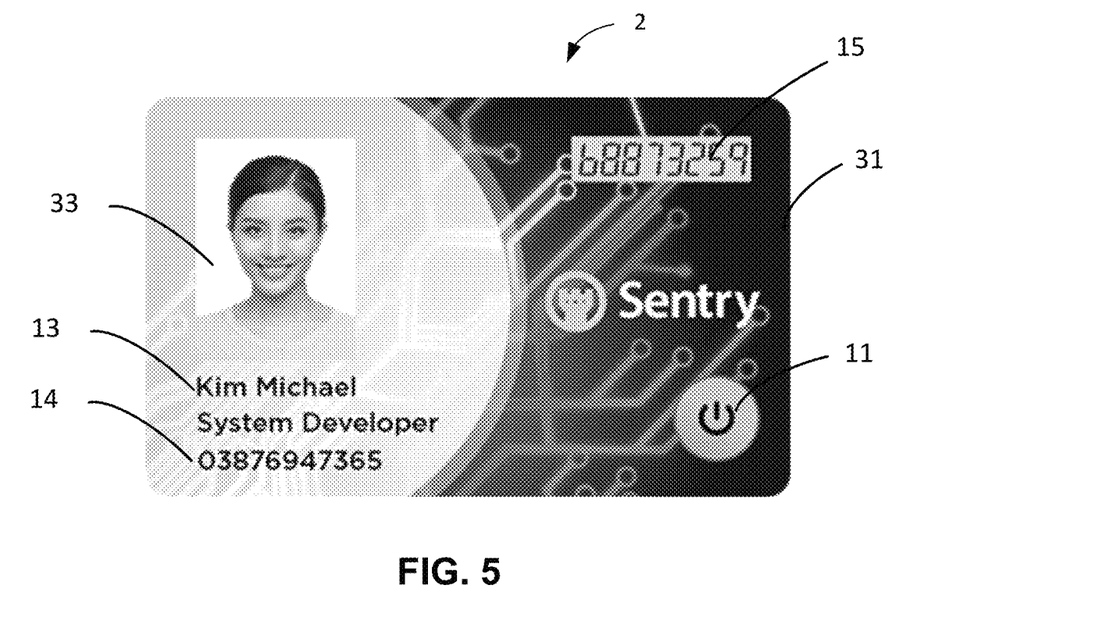
FIG. 5 illustrates a top view of one possible multi-purpose smart card with user-trusted bond according to one embodiment of the present disclosure.
Figure 6:
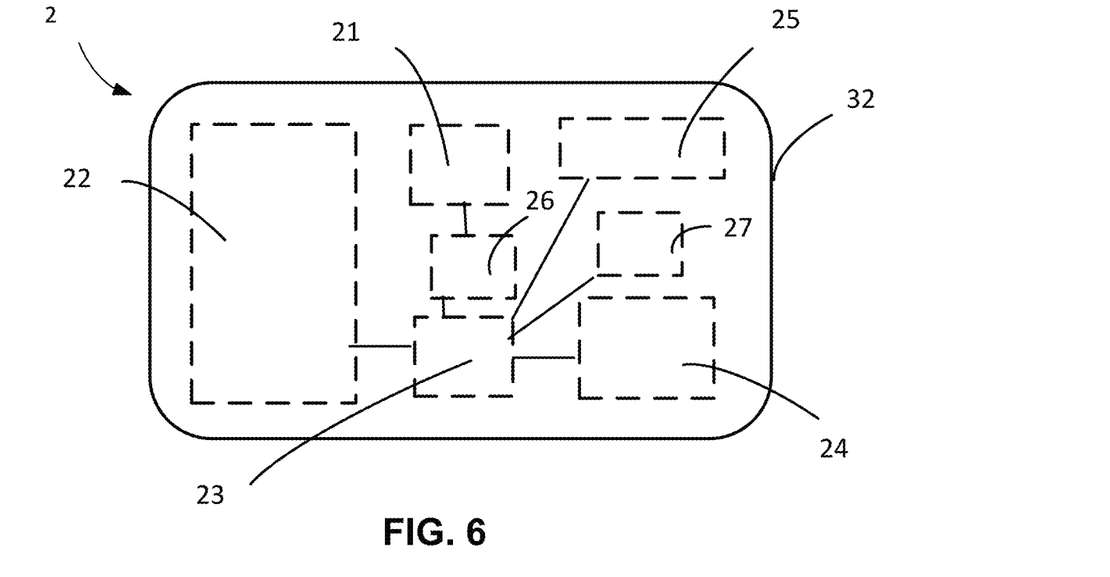
FIG. 6 generally illustrates the internal elements found in the multi-purpose smart card with user-trusted bond shown at FIG. 5 according to an embodiment of the present disclosure.

The smart card 2 as shown at FIGS. 5-6 includes generally a battery or other source of onboard power 23. In one embodiment, a piece including a microprocessor, a memory and a battery 23 shown as one single block for simplicity, but as generally described in the cited art via incorporation by reference is a battery with extended life (3-5 years) non-BLE (Bluetooth Low Energy). In other embodiments, other power sources can be used alternatively. What is contemplated is the use of any type of portable power enabled locally.

The card 2, may also include a One Time Password Generator (OTP) 15, 25, an UHF RFID tag for long-range, in-faculty detection (up to 30 feet) 22 for the connection to the data connection system 10 shown at FIG. 5, and a multi-protocol contactless access control interface 21 and low power Bluetooth connector.

As shown at FIG. 5, the cover of the card 2 may be printed using any normal thermal color printer (the technology generally available in association with the production of security cards) and glued onto the electronics inside (shown at FIG. 6) or using any new technology to merge the imagery with such electronics. One of ordinary skill in the art will recognize that while the current mode is planned as a printed cover with identity elements such as a face picture 33, the name and titled 13, and an employee code 14. One of ordinary skill in the art will recognize that the use of surface identification information reinforces the system in that it creates a visual third-legal protection and allows the smart card to be used normally as a visual entry-point identification. All visual identification technologies is anticipated and claimed, for example all protection systems used on currencies like dollar bills or shipping box identification such as a code bar or other code (not shown).

Also shown at FIG. 5 is a thumb power symbol 11 designed to help a user power the card up in one embodiment. In another embodiment, the card remains permanently powered or semi-powered as used in e-Reader book technology. This element 11 as shown below 24 can also include a fingerprint reader of the model and type used in other known devices, such as the iPhone 7 to 9. These readers, for example, can simply read certain fingerprint location data, can also be paired with an inductance or resistance sensor, or may also include a thermal sensor to avoid false reads. As part of the iPhone 10+ technology, such finger readers have been conveniently replaced with a camera able to map and read 3D facial features according to other known technology. The card 2 as shown above and this includes a reader 24 linked with biometric information. One of ordinary skill understands that as new biometric readers become more sophisticated, they can be added to the reader 24. While it shows a biometric reader 24 located on the card 2, what is contemplated is the use of any type of connection between the microprocessor on the card and a reader locally installed (as shown) or remove (e.g., on an external pad/reader at a terminal or door).

To name some of the most common sensors that may be added, these include: (a) temperature sensors including infrared sensors, IC sensors, Termistors, resistor temperature detectors, and thermocouples, (b) proximity sensors such as inductive sensors, capacitive sensors, photoelectric sensors, ultrasonic sensors, (c) pressure sensors, (d) infrared sensors, (e) image sensors such as charge-coupled device or complementary metal-oxide semiconductor imagers, (f) motion detection sensors, (g) accelerometer sensors, (h) gyroscopic sensors such as rotary, vibrating, or optical/MEMS sensors, (i) optical sensors such as photodetector, fiber optic detector, pyrometer, or proximity detector.

As shown, the card 2 includes at FIG. 6 an Ultra-High Frequency (UHF) for Radio-Frequency Identification (RFID). UHF band RFID uses a 860-960 MHz band and allows it to read multiple tags as a batch at a longer range under the ISO18000-63/ECP global standard, for example, the LXMS21NCH from muRata® tag for long-range in-faculty detection (up to 30 feet) 22. For example, this technology allows for the management in a smart factory of PCB's. This technology can work with pocket type readers also as Blueberry UHF MS4 from Tetrium Technologies™.

As explained, a location having such UHF band RFID in place will create an environment where holders of the smart card 2 having a tag recognized by the system will automatically be tracked for location. As explained below, loss of range can result in breach of trust of cards using this technology. In one embodiment of the present disclosure, the card 2 supports both UCODE-7 and UCODE-8—the technology from NXP® Semiconductors. This is designed to support the MIFARE Classic EV1, Advanced EV1, DesFire EV1 and HID ICLASS interfaces.

The OTP system shown above can operate on time-synchronization between an authentication server and the implanted local device. These are notoriously unstable over long periods of time. The second can be based on a mathematical algorithm to generate a new password based on a previous password. Others include challenge. The technology onboard above is very similar to RSA Security's SecurID™ tokens. This system also has programmable support for both the HTOP and the TOTP systems.

As explained below, the key notion is to have a card 2 having such biometric information able to establish trust with a user 1 using one of many ways defined below. Also as explained below, this trust established can be broken one of many ways often linked with the nature, quantity, and type of sensors found in the card 2. Each set of use can relate to different factors linked with trust and detailed in a set of example below.

Method of Establishing and Severing Trust

A famous unattributed quote reads, "trust takes years to build, seconds to break, and forever to repair." At the heart of this invention is the notion that card 2 can be personalized and attached via an additional trust-based link to the user 1 of the card 2. To establish trust, several steps described are needed, most often linked with sensor entry and biometric verification. To break the established trust, one of a handful or plurality of conditions must be met. The inventors now describe generally and in great detail the different steps, processes and systems linked with the establishment and severing of the trust between a user 1 and a card 2 as described above in FIGS. 4-6.

Returning to FIG. 4, instead of using multiple fields or multiple actions when a card 2 is placed in proximity of a reader (for example 3 on FIG. 4), in one embodiment, an auto-generated token 6 is transmitted wirelessly or via a physical contact without any interaction from the user when the person gets in close proximity to the computer 3. If trust 11 was established, then a trust-based token 12 can be sent instead or in addition to the normal string of character or the auto-generated token 6. For example, a card normally requires at a reader the person to enter a retina scan in addition to sliding the card in and typing a PIN. By placing the retina information inside the memory of the card 2, the user can grab the card 2 and enter a PIN manually and enter the retina information in a sensor on the card. The card 2 would connect the PIN with the biometric information in the card, validate the trust and establish the bond. When the card is placed in the proximity of the detector, if trust was established the data 12 would be sent directly and most likely wirelessly to open the door without a need for a PIN or the retina scan. In other cases, the card could be placed in and that data 6 would be sent directly which includes both the PIN and the retina information.

In such a described system, there is no need for the storage of password in the reader station 3 or the backend server 4 or the issuance/management of the OTP token 7 by the server which then can operate in complete disconnection from the server. While there is no need for the backend server 4 to operate in connection, one of ordinary skill in the art understands that additional levels of security could also be implemented to further improve the safety. For example, in the above example, if using the card 2 the user does not need to enter a PIN and an eye sensor map at an eye reader, the backend server 4 could add a third higher level of safety unique to the person, such as the request for an additional entry of a code (e.g., please provide your date of birth).

Simple typed passwords normally used are then replaced, for example, by a biometric authentication and acceptance code 6. This new process and system includes the storage of biometric authentication into the card or other type of information of high relevance, and the validation by the user (i.e., the connection) of the card. In one embodiment, the same card which holds the biometric information also serves to create the OTP token and transmits it directly to replace functionality with other, lower generation cards.

Initial Pairing With New User

Figure 7:
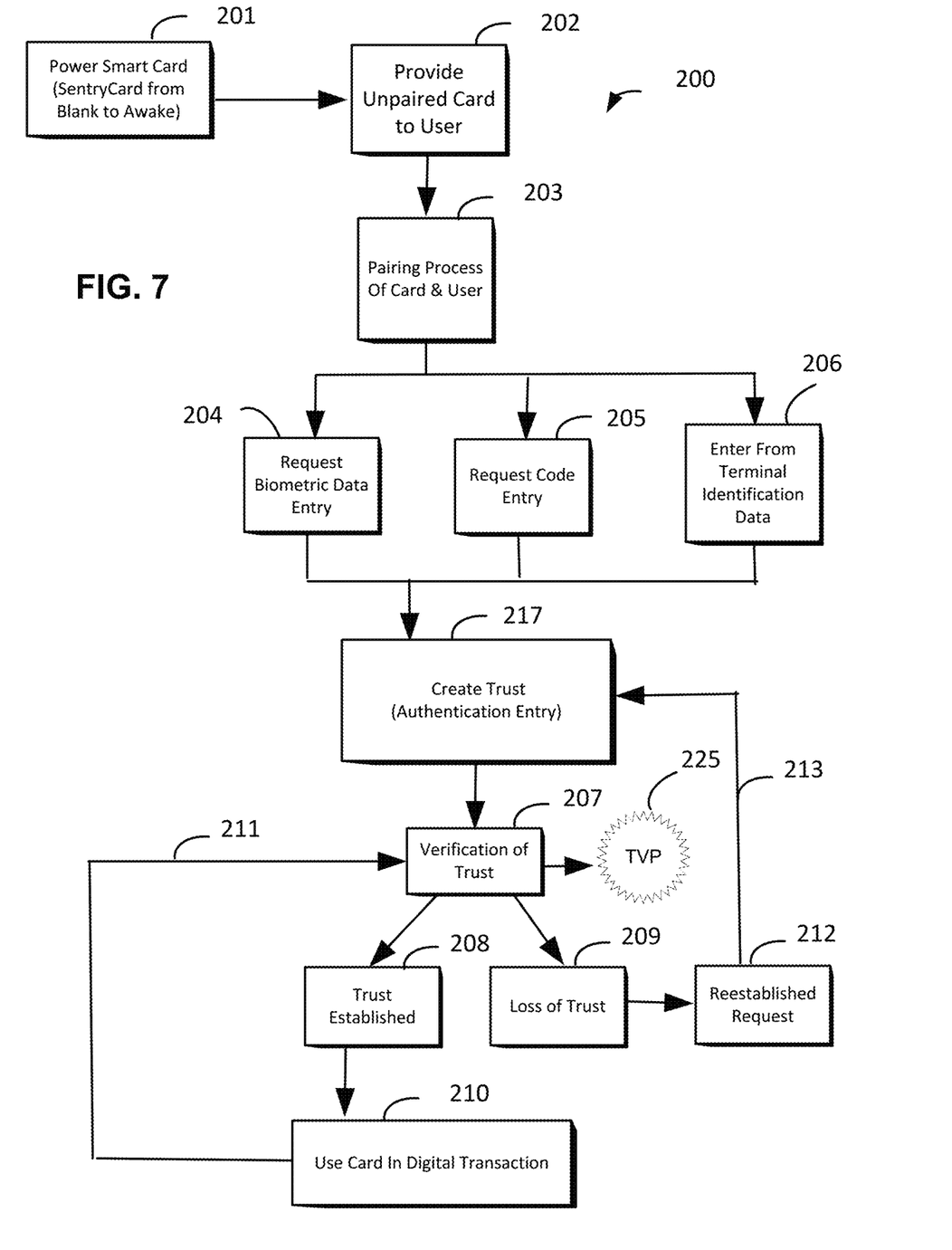
FIG. 7 illustrates the process and steps for creating the trusted bond between the multi-purpose smart card with user-trusted bond.

Having described the new smart card 2 above, and shown it in one embodiment having a thumbprint power-on system 11, a digital code generator 15, and visible identification 22 and associated electronics as shown at FIG. 6, its use is best shown at the diagram of FIG. 7. As shown, first the smart card 2 as is first powered 201 in a first step often simply by pushing on the thumbprint and holding this position down for a longer-than-ordinary period (e.g., three seconds) such as touching element 24 on FIG. 6 or any other equivalent element as a simple switch with a timer wake mode. This will move the card from a "blank" mode to an "awake" mode. In this awake mode, at this stage, the card does not have an assigned user, it does not have, for example, biometric information stored such as (a) a picture, (b) personal identifiable information such as date of birth, or (c) thumb information or other type of information (e.g., facial mapping) that can be verified locally with a sensor of the right type.

While one type of sensor is described or shown, other types are also contemplated, for example, biometric data linked with LED or heart measurement of the object in context with the user's skin. In other cards, the device may remain on constantly in a sleep mode until it reaches the proximity of a reader and can be activated wirelessly via an antenna system into a live mode. Also contemplated are other ordinary and known methods of opening or powering up a card or any electronic element, including a switch, a tab, or even dynamic movement an piezoelectric current created by moving the body of the card 2.

The card 2, if awakened in one embodiment, will then run internal diagnostics and use the computerized OPT generator 15 to send messages as the system powers up.

Once powered up, the system checks and finds the storage room where biometric data is normally found to be empty in the memory bank. The goal of the pairing is to fill this memory according to its internal programming and the type of card 2 present. Guidance may be given to the user for "New ID" as part of a 8 DEL display as shown 15 or any other equivalent programming tool. A simple system can be used to scroll text in the 8 DEL 15. For example, if a thumbprint is required, the display will alternate "NEW ID" and "TOUCH PW" as the sensor measures the print. In other embodiments, an external portable device is used to secure a clear set of the biometric information, and this data is uploaded directly via the UBS port connector to the memory. In the event the card has a camera and a 3D imprint of the face must be taken, the display will read "NEW ID" and "LOOK UP" and further information on initial phases of pairing of the card will be given in a guide or screen instruction. Once again, this system can be done as per the known technology of pairing linked with other types of phones.

While only a minor numerical display is shown, one of ordinary skill in the art will understand that over time, such displays may be increased in resolution and capacity where a flexible screen could be used. As shown, a face image can be uploaded to the card as additional biometric instruction.

The unpaired card 201 is then provided to a person or a new user which will be linked with the card 202 for which the card is assigned. In the step of pairing the card 203 to the user as shown at FIG. 7, one of several methods of pairing can be done depending on the type of card 2 and the technology linked with the card 2 selected. For example, if the reader 24 is an index fingerprint reader, the card may read: "Finger R" for reading the finger. Other types of identification 203 may be conducted; for example a camera can take a 3D image of the person's face. The technology to read biometric information is now prevalent in the world of cell phones (i.e., the iPhone 7 using fingerprints and iPhone 10 using facial 3D mapping). In the world of exercising, rings or watches are now designed with integrated sensors which monitor and measure multiple life signs. For example, such external devices can be paired with the card using Bluetooth technology. All of these modes of pairing are linked with a request and entry of biometric data 204 at the card 2 locally.

Shown also at FIG. 7 are different modes of pairing 205 and 206 where a simple code can be entered and used (e.g., passcode) which lowers the level of security but remains connected with the system. For example, such lower-level security can be used during a sports event for normal volunteers who are given access to limited portions of the stadium and higher biometric data entry 203 would be reserved to those few given access to some sensitive areas like the player's locker rooms or the ticketing center.

Terminal identification data 206 may be reserved for faster bulk processing of biometric entry 204, 205, or for entry of data like iris reading where such reading technology is not sufficiently advanced to be initially measured and mapped by a portable miniature element, but where a confirmation reader can be of simpler technology and found on the smart card. In the event the card 2 is connected to the identification data terminal, an additional system of identification is planned.

Creating Trust

At step 207 as shown at FIG. 7, once a card 2 has been paired with a user 1 as shown at FIG. 4, trust can be created. Once the information has been entered and the card 2 has been now paired with a user, the key novel concept with this device is the notion of "trust" or "active pairing." As defined in this invention, a person/user holding a card is paired or matched with the device 207 by validating the required information entered as part of the pairing process 202.

For example, in the morning, once a user 1 grabs a wallet with the card that has previously been paired 203, that user 1 will look at the card 2 and, once it is powered, trust may have been broken. For example, the numerical window 15 may simply read "TRUSTREQ" or the image 22 may be replaced with a different image or a notice. Before the smart card 2 can be used, trust once verified can be established 208 with the card 2.

Before any use of the card 2, the computer system 200 will verify trust 207 to see if it is established 208 in order to use the card 210 in a transaction. This simple system illustrated at 211 allows for certain "Trust Verification Parameters" TVP 225 established, was lost 209 or confirm loss of trust 209. By loss of trust, several concepts come in play to help improve the security.

Trust Verification Parameters

In most cases, users who use the card 2 for any purpose will have a predetermined goal in mind as to the use. Many different uses are contemplated, and each is linked with one possible example. As shown at FIG. 7, at many times in the cycle of use (often before use of the card 210 and data is sent out), trust must be established 208. In case of loss of trust 209, trust can be reestablished 212 (in some embodiments). In case of reestablishment, the user may be asked to return to a phase of authentication 207.

Figure 8:
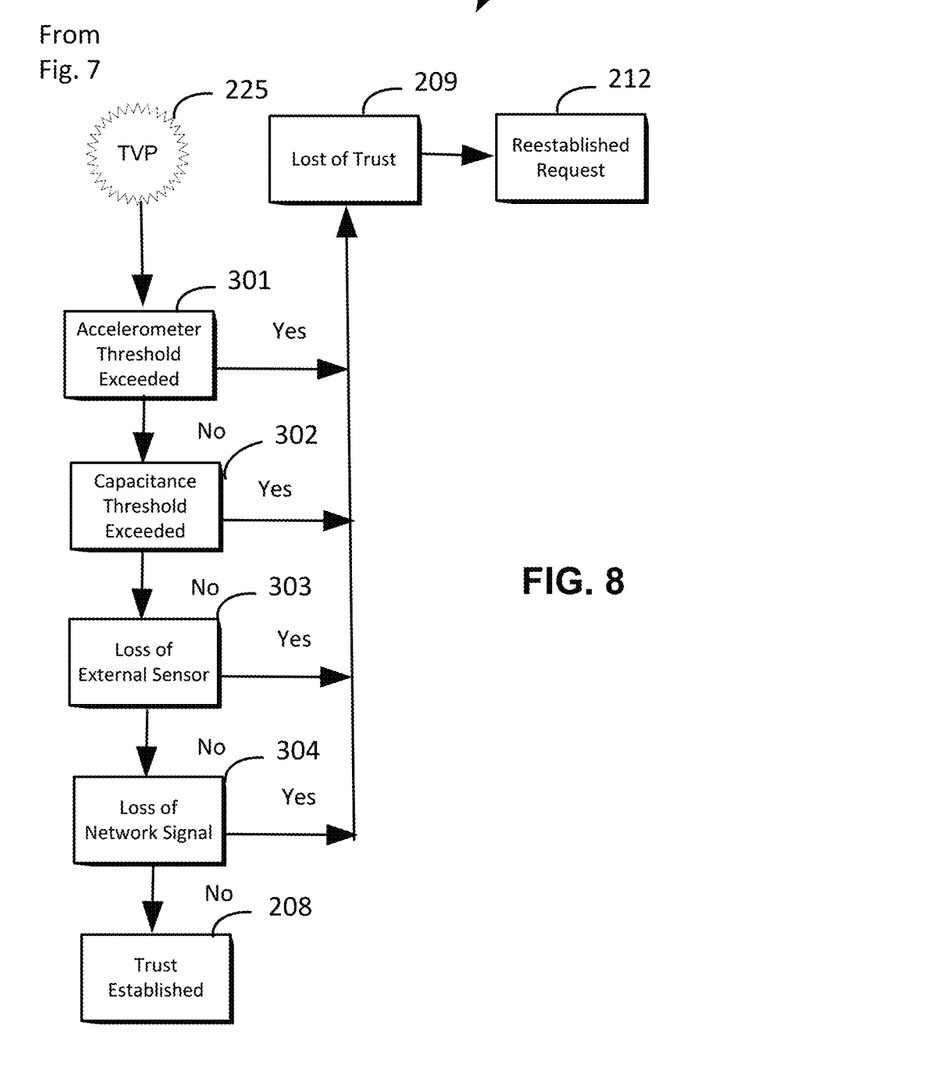
FIG. 8 illustrates a diagram of use of the trust verification parameters as shown part of the process of FIG. 7.

At FIG. 8, what is shown is a sequential logic where a set of parameters 301, 302, 303, and 304 are shown. One of ordinary skill in the art will understand that while four parameters are shown, what is contemplated is the function of one or more of these parameters, sequentially, in tandem or in any set of arrangement which results in the test of external conditions such, for example randomly.

An accelerometer 301 can be used simply on the card 2 and programmed as a condition for immediate loss of trust. For example, above a level of the sensor value, the trust can be broken. In one example, this situation can be used to avoid the misuse of corporate cards. If a third party steals or rips the card from another, the trust could be broken. Accelerometers or sensors 26 as shown at FIG. 4 can be imbedded in the smart card 2 and in case of a higher value than a set threshold (e.g., card was dropped, robbed, or even was moved in a suspicious way) the trust can be broken 301. Once again, once trust is broken, the card 2 will not issue the proper information to any external device.

A capacitance sensor 27 as shown at FIG. 6 can be added and operate in the card in connection with the other elements for the detection of a value generally related to a person's body capacity value. If the person drops the card or the capacitance value is lowered too much, the card will be considered to have been moved a fixed distance from the person's body 302. This is a similar process to when an iWatch is removed from the wrist of a user and some sensors are then considered to have lost the user physical connection. In this first embodiment, a low capacitance value can be set as a trigger point as well as a higher capacitance value. For example, lockers at a pool may be paired with cards 2 for storing personal effects. The card may be given to the person in the form of a wrist piece. By setting a TVP value of zero or outside of an initially measured value when the trust was created 207 if the card 2 is disconnected from the user 1 and then used by a second individual, when trust is tested 207, if the value is outside of a range or if the value has moved in the past (i.e., last hour) outside of the range, there could be a simple loss of trust 209.

In another example, an external sensor (a watch, a phone, or other device) can be used as shown by 8, 9, and 10 at FIG. 4 as proximity detector. After a Bluetooth or other short distance connection is lost, the trust is broken 303. For example, employees can be given cards 2 that are paired at work where a network is present. Once the employee leaves the workplace, the signal is lost and trust can be broken immediately or when tested by looking in the data if it has been lost. As a further example, a coffee chain may have some type of signal value up at all of its locations for use by its employees. The same way the loss of a signal is described as a condition, one of ordinary skill in the art will understand that the finding of a signal may also be a condition for loss of trust.

In yet another possible variation, the smart card monitors the workplace wireless signal, and once the signal is lost, trust is broken 304. As shown at FIG. 4, the network 9 is as shown. The same way, it could be other types of networks 8, 10.

Example 1: Monthly Ski Pass

Most ski resorts sell ski passes to be worn by riders. These passes are expensive and because of bulky snow equipment and difficult environmental conditions, the management of these passes can be a nightmare for station owners. People may easily exchange and give others their passes which are too often hard to verify. By using the above-described technology, the season pass can be personalized to the user in one of many ways at the time of issuance by entry of biometric information. Such cards can be custom designed with TVP 225 that are best adapted to creating a loss of trust best adapted with skiing. For example, since this sport involves important changes in accelerations, the accelerometer threshold 301 may not be well adapted. Pairing the card with a user's own personal cell phone may also not be best adapted since people may desire to ski without a phone. But since most users have single pairs of boots, a simple RFID can be glued to the person's ski boots. When trust is verified 207, as long as the ski pass card 2 is within a short range of the RFID on the boots trust is established 208 and use of the card is enabled 210.

Example 2: Employee Value

Today many online systems require two-level security and need the card at 210 to send automatically and without prompting the user the information as shown at FIG. 4. In the case of an employee at work trying to enter into a computer system, the card if paired will automatically verify trust 207, once established 208 will send automatically 210 the data to the computer to gain access without any other confirmation. As described, the conditions of trust could be the ambient operation of the local network as a signal, the presence of the user's own private cell phone with Bluetooth in proximity, a calibrated value of capacitance of the user sitting at the chair, etc. Loss of signal also can be added as an alert condition. For example, in the workplace, all employee cards may be deactivated simply by sending a certain fixed signal over the wireless or shutting down the wireless. Also, for the trust to be established, a person may have had to pass door security or badge in within a certain period of time (e.g., 30 minutes).

As part of this card 2, what is also important is that while conditions to establish trust 217 may be visible, known, and fixed for any type of use, these the TVP 225 may not be known or can be changed or modified to further increase the level of security.

The current version includes an advanced ultra-thin flexible circuit with a 32-bit ARM microprocessor of technology similar to those of cell phones. These Advance RISK Machines (ARM) exist in 32-bit and 64-bit. It also includes a 256-bit AES hardware encryption, the most common federal government standard. This standard is included in the ISO/IEC 18033-3 standard. In addition, the current model uses Bluetooth, Bluetooth Low-Energy, Near-field Communication (10 cm or less), and USB interface. The flash memory is around 8 GB in size and the battery is of a rechargeable type.

Also what is contemplated is the use of publicly described "fuzzy extractor" algorithms. It is possible to generate a set of deterministic keys directly from the user's biometric template as part of the SentryID platform. This eliminates the vulnerabilities associated with the need to store cryptographic keys as the keys are only generated at the point of authentication and are transient with no need to be persisted. The SentryID platform may apply this method to provide a trusted platform that greatly exceeds existing authentication mechanisms.

What is described herein is a general concept of creating a trusted bond between a card 2 and a user 1. By making this connection early, before entry of information is truly needed, time and effort is saved. The card 2 also appears to work automatically without the need to bother the user at the needed point. A person holding the paired and trusted card 2 can enter into the range of a wireless server network and via the notion the card was never "untrusted" using the process at FIG. 7, automatic entry is given to the network. Also, while FIG. 7 shows multiple ways to lose the trusted bond, for each situation, it may be possible to program different types of loss of bond for each type of environment. For example, where greater security is needed, only one of the trust loss conductions 301, 302, 303, and 304 would sever the loss as shown at FIG. 8. But in other configurations, what would be required is the loss of two parameters. For example, as long as the card remains in capacitance contact 302, the trust could not be lost even if the network 304 is lost. Such configurations are endless. As illustrated at FIG. 6 for simplicity purposes the line 310 and the logic requires for the non-loss of the four parameters 301, 302, 303, and 304.

Also of great interest is how this card 2 can be remotely activated or deactivated using external signals like wireless radios such as Bluetooth, UHF RFID, WiFi, etc. For example, for additional security, all cards can be "untrusted" via an external command. For example, in case of a security breach, all cards can be deactivated. In an even more severe breach, the deactivation may prevent any reestablishment of trust.

In another embodiment, the image 22 as shown at FIG. 5 is an e-ink or active display capable of displaying QR codes or other types of information. This allows multiple more possibilities. For example, a QR scanner may be placed next to a door. What is also contemplated is the ability to visually indicate when a cardholder has entered into an unauthorized area by flashing a warning indicator on the integrated card display or some portion of a code. Also, the inventor teaches how this card can serve to visually indicate when cardholder has entered into an unauthorized area by brightly illuminating the card edge or surface using optical fibers and similar materials placed on the card. Further, the card 2 can be activated only after the user authenticates himself through a second device, such as a smart phone, biometric capture device, or embedded input device, etc. The technology for example can be paired with the iWatch and require an iWatch to function.

What is shown and described above and in the drawings as FIGS. 4-8 is a multi-purpose smart card in a dynamic environment, the dynamic environment comprising an operative field from one of a data connection system, a GPS or normal telecommunication network, a local wireless network, and the smart card comprising a top layer with a cover printed and glued to a bottom layer, the cover including identity elements, an activation symbol, a code display window for allowing illustration of a One Time Password Generator (OTP), the bottom base later on which is a microprocessor for running in a memory and connected to a power source a software for operation of the smart card in the dynamic environment, and a mass storage memory for storing biometric information of a user and private data, the microprocessor connected to a one-time password generator (OTP), a biometric reader, an UHF RFID tag for long-range, in-faculty detection, a multi-protocol contactless access control interface with low power Bluetooth connector, and at least one sensor, and wherein the smart card is configured to enable an upload into the memory of a user biometric data, and enabled to allow the user having the user biometric data into the memory to perform an operation of pairing in which the user authenticates himself to the smart card by providing biometric information to the smart card at the biometric reader.

The smart card is further configured to enable at least a portion of the dynamic environment from (a) the data connection system, (b) the GPS or normal telecommunication network, or (c) the local wireless network, to interact with one of (i) the UHF RFID tag for long-range, in-faculty detection, (ii) the multi-protocol contactless access control interface with low power Bluetooth connector, or (iii) at least one sensor for the management (establishing or losing) of trust between the smart card and the user, where the smart card is further configured as part of the management of trust between the smart card and the user to allow for the programming of at least one trust verification parameter (TVP) to be tested and confirmed before the card releases data to help as part of a secured digital transaction, and where the smart card is further configured as part of the management of trust between the smart card and the user to allow for the programming of more than one trust verification parameter (TVP) to each be tested serially, randomly or sequentially before the card releases data to help as part of a secured digital transaction.

Also the data released to help as part of the secured digital transaction includes a security token (HOTP or TOTP systems) and at least one sensor is selected from the group of: (a) temperature sensors including infrared sensors, IC sensors, Thermistors, resistor temperature detectors, and thermocouples, (b) proximity sensors such as inductive sensors, capacitive sensors, photoelectric sensors, ultrasonic sensors, (c) pressure sensors, (d) infrared sensors, (e) image sensors such as charge-coupled device or complementary metal-oxide semiconductor imagers, (f) motion detection sensors, (g) accelerometer sensors, (h) gyroscopic sensors such as rotary, vibrating, or optical/MEMS sensors, (i) optical sensors such as photodetector, fiber optic detector, pyrometer, or proximity detectors.

The same way, a process of use of a multi-purpose smart card in a dynamic environment, the dynamic environment comprising one of an operative field from one of a data connection system, a GPS or normal telecommunication network, a local wireless network, and the smart card comprising a top layer with a cover printed and glued to a bottom layer, the cover including identity elements, an activation symbol, a code display window for allowing illustration of a One Time Password Generator (OTP), the bottom base later on which is a microprocessor for running in a memory and connected to a power source a software for operation of the smart card in the dynamic environment, and a mass storage memory for storing biometric information of a user and private data, the microprocessor connected to a one time password generator (OTP), a biometric reader, an UHF RFID tag for long-range, in-faculty detection, a multi-protocol contactless access control interface with low power Bluetooth connector, and at least one sensor, and wherein the smart card is configured to enable an upload into the memory of a user biometric data, and enabled to allow the user having the user biometric data into the memory to perform an operation of pairing in which the user authenticates himself to the smart card by providing biometric information to the smart card at the biometric reader, the method comprising the steps of powering an unpaired card, providing to a new user the unpaired card, pairing the card with the user by either one of (a) entry of the user's biometric data, (b) the request of a code, or (c) the entry from a terminal of identification data; and creating a trust by allowing the card further configured to enable at least a portion of the dynamic environment from (a) the data connection system, (b) the GPS or normal telecommunication network, or (c) the local wireless network, to interact with one of (i) the UHF RFID tag for long-range, in-faculty detection, (ii) the multi-protocol contactless access control interface with low power Bluetooth connector, or (iii) at least one sensor.

Also, what is contemplated is the step of allowing for the management (establishing or losing) of trust between the smart card and the user, the step of allowing for the programming of at least one trust verification parameter (TVP) to be tested and confirmed before the card releases data to help as part of a secured digital transaction, the step of allowing for the programming of more than one trust verification parameter (TVP) to each be tested serially, randomly or sequentially before the card releases data to help as part of a secured digital transaction.

Finally, also the above describes a method of use of a smart card in a dynamic environment, the dynamic environment comprising one of an operative field from one of a data connection system, a GPS or normal telecommunication network, a local wireless network, and the smart card comprising a top layer with a cover printed and glued to a bottom layer, the cover including identity elements, an activation symbol, a code display window for allowing illustration of a One Time Password Generator (OTP), the bottom base later on which is a microprocessor for running in a memory and connected to a power source a software for operation of the smart card in the dynamic environment, and a mass storage memory for storing biometric information of a user and private data, the microprocessor connected to a one-time password generator (OTP), a biometric reader, an UHF RFID tag for long-range, in-faculty detection, a multi-protocol contactless access control interface with low power Bluetooth connector, and at least one sensor, and wherein the smart card is configured to enable an upload into the memory of a user biometric data, and enabled to allow the user having the user biometric data into the memory to perform an operation of pairing in which the user authenticates himself to the smart card by providing biometric information to the smart card at the biometric reader; the method comprising the steps of pairing an unpaired card to a user by inserting biometric data in the memory of the card, creating trust by allowing a user at the biometric reader to validate the paired biometric data in the memory of the card, and establishing a set of trust verification parameters for testing of trust (established or loss) before any use of the card in a digital transaction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multi-purpose smart card in a dynamic environment, the dynamic environment comprising an operative field configured as a data connection and communication system, the multi-purpose smart card comprising:
   a top layer including a code display window for presentation of a One Time Password (OTP);
   a bottom layer including a biometric reader, a microprocessor with a memory that is suitable to retain biometric information of a user generated by the biometric reader wherein the multi-purpose smart card is configured to (i) upload into the memory user biometric data, and (ii) allow the user to perform an operation of pairing in which the user authenticates himself to the smart card by providing biometric information to the smart card at the biometric reader; and
   at least one sensor suitable to enable at least one of establishing and losing trust between the smart card and the user and configured as part of a management of trust between the smart card and the user to allow for at least one trust verification parameter (TVP) to be tested and confirmed before the multi-purpose smart card releases data as part of a secured digital transaction.

2. The multi-purpose smart card in a dynamic environment of claim 1, wherein the smart card is further configured to enable at least a portion of the dynamic environment from at least one of a GPS, telecommunication network and the local wireless network, to interact with a multi-protocol contactless access control interface.

3. The multi-purpose smart card in a dynamic environment of claim 1, wherein the management of trust between the multi-purpose smart card and the user provides multiple trust verification parameters to each be tested before the card releases data to help as part of a secured digital transaction.

4. The multi-purpose smart card in a dynamic environment of claim 1, wherein the data released to help as part of the secured digital transaction includes a security token (HOTP or TOTP systems).

5. The multi-purpose smart card in a dynamic environment of claim 1, wherein the at least one sensor is selected from the group consisting of infrared sensors, IC sensors, Thermistors, resistor temperature detectors, thermocouples, inductive sensors, capacitive sensors, photoelectric sensors, ultrasonic sensors, pressure sensors, infrared sensors, charge-coupled devices, complementary metal-oxide semiconductor imagers, motion detection sensors, accelerometer sensors, rotary, vibrating, or optical/MEMS sensors, photodetector, fiber optic detectors, pyrometers, and proximity detectors.

6. A method for use of a multi-purpose smart card in a dynamic environment comprising:
   providing the dynamic environment comprising an operative field configured as a data connection and communication system, the multi-purpose smart card comprising a top layer including a code display window for presentation of a One Time Password (OTP); a bottom layer including a biometric reader, a microprocessor with a memory that is suitable to retain biometric information of a user generated by the biometric reader wherein the multi-purpose smart card is configured to (i) upload into the memory user biometric data, and (ii) allow the user to perform an operation of pairing in which the user authenticates himself to the smart card by providing biometric information to the smart card at the biometric reader; and at least one sensor suitable to enable at least one of establishing and losing trust between the smart card and the user and configured as part of a management of trust between the smart card and the user to allow for at least one trust verification parameter (TVP) to be tested and confirmed before the multi-purpose smart card releases data as part of a secured digital transaction;
   powering an unpaired card;
   providing to a new user the unpaired card;
   pairing the card with the user by entry of the user's biometric data; and
   establishing trust by allowing the card further configured to enable at least a portion of the dynamic environment interact with the at least one sensor.

7. The process of use the multi-purpose smart card in a dynamic environment of claim 6, including the step of allowing at least one trust verification parameter (TVP) to be tested and confirmed before the card releases data as part of a secured digital transaction.

8. The process of use the multi-purpose smart card in a dynamic environment of claim 7, further including the step of allowing for the programming of more than one trust verification parameter (TVP) to each be tested serially, randomly or sequentially before the card releases data to help as part of a secured digital transaction.

9. The process of use of the multi-purpose smart card in a dynamic environment of claim 6, wherein the at least one sensor is selected from the group consisting of infrared sensors, IC sensors, Thermistors, resistor temperature detectors, thermocouples, inductive sensors, capacitive sensors, photoelectric sensors, ultrasonic sensors, pressure sensors, infrared sensors, charge-coupled devices, complementary metal-oxide semiconductor imagers, motion detection sensors, accelerometer sensors, rotary, vibrating, or optical/MEMS sensors, photodetector, fiber optic detectors, pyrometers, and proximity detectors.

10. A method for use of a smart card in a dynamic environment, the dynamic environment, the dynamic environment comprising:
    providing the dynamic environment comprising an operative field configured as a data connection and communication system, the multi-purpose smart card comprising a top layer including a code display window for presentation of a One Time Password (OTP); a bottom layer including a biometric reader, a microprocessor with a memory that is suitable to retain biometric information of a user generated by the biometric reader wherein the multi-purpose smart card is configured to (i) upload into the memory user biometric data, and (ii) allow the user to perform an operation of pairing in which the user authenticates himself to the smart card by providing biometric information to the smart card at the biometric reader; and at least one sensor suitable to enable at least one of establishing and losing trust between the smart card and the user and configured as part of a management of trust between the smart card and the user to allow for at least one trust verification parameter (TVP) to be tested and confirmed before the multi-purpose smart card releases data as part of a secured digital transaction; pairing an unpaired card to a user by inserting biometric data in the memory of the card;
    establishing trust by allowing a user at the biometric reader to validate the paired biometric data in the memory of the card; and
    establishing a set of trust verification parameters for testing of trust before any use of the card in a digital transaction.

11. The method of claim 10, wherein the smart card is further configured to enable at least a portion of the dynamic environment to interact with one of (i) the UHR RFID tag for long-range, in-faculty detection, (ii) the multi-protocol contactless access control interface with low power Bluetooth connector, or (iii) at least one sensor for the management of trust between the smart card and the user.

12. The method of claim 10, wherein the smart card is further configured as part of the management of trust between the smart card and the user to allow for the step of programming at least one trust verification parameter (TVP) to be tested and confirmed before the card releases data to help as part of a secured digital transaction.

13. The method of claim 10, wherein the smart card is further configured as part of the management of trust between the smart card and the user to allow for step of programming of more than one trust verification parameter (TVP) to each be tested serially, randomly or sequentially before the card releases data to help as part of a secured digital transaction.

14. The method of claim 10, wherein the method includes the additional step of releasing data as part of the secured digital transaction that includes a security token (HOTP or TOTP systems).

15. The Method of claim 10, wherein at least one sensor of the card is selected from the group consisting of infrared sensors, IC sensors, Thermistors, resistor temperature detectors, thermocouples, inductive sensors, capacitive sensors, photoelectric sensors, ultrasonic sensors, pressure sensors, infrared sensors, charge-coupled devices, complementary metal-oxide semiconductor imagers, motion detection sensors, accelerometer sensors, rotary, vibrating, or optical/MEMS sensors, photodetector, fiber optic detectors, pyrometers, and proximity detectors.

16. A smart card comprising:
an operative field configured as a data communication system for operation of the smart card comprising:
a top layer including a window for presentation of a One Time Password (OTP);
a bottom layer including a biometric reader, a microprocessor, and a memory suitable to retain biometric information of a user generated by the biometric reader; the smart card being further configured to (i) upload into the memory user biometric data, and (ii) perform an operation of pairing in which the user self-authenticates to the smart card by providing biometric information; and
a plurality of sensors suitable to enable at least one of establishing and losing trust between the smart card and the user, each sensor being configured as part of a management of trust between the smart card and the user to allow for at least one trust verification parameter (TVP) to be confirmed before the multi-purpose smart card releases data as part of a secured digital transaction.

17. The smart card of claim 16, further configured to enable at least a portion of the operative field from at least one of a GPS, telecommunication network and the local wireless network, to interact with a multi-protocol contactless access control interface.

18. The smart card of claim 16, wherein the management of trust between the smart card and the user provides multiple trust verification parameters to each be tested before the card releases data to help as part of a secured digital transaction.

19. The smart card of claim 16, wherein the data released to help as part of the secured digital transaction includes a security token (HOTP or TOTP systems).

20. The smart card in a dynamic environment of claim 16, wherein the sensors are selected from the group consisting of infrared sensors, IC sensors, Thermistors, resistor temperature detectors, thermocouples, inductive sensors, capacitive sensors, photoelectric sensors, ultrasonic sensors, pressure sensors, infrared sensors, charge-coupled devices, complementary metal-oxide semiconductor imagers, motion detection sensors, accelerometer sensors, rotary, vibrating, or optical/MEMS sensors, photodetector, fiber optic detectors, pyrometers, and proximity detectors.

\* \* \* \* \*